United States Patent [19]

Haake

[11] 3,833,224

[45] *Sept. 3, 1974

[54] TAPE RECORDER WITH CASSETTE INVERTOR

[75] Inventor: Robert Haake, Pasadena, Calif.

[73] Assignee: Bell & Howell Company, Chicago, Ill.

[ * ] Notice: The portion of the term of this patent subsequent to Sept. 7, 1988, has been disclaimed.

[22] Filed: Jan. 12, 1973

[21] Appl. No.: 322,995

Related U.S. Application Data

[63] Continuation of Ser. No. 50,407, June 29, 1970, abandoned.

[52] U.S. Cl. .................................... 360/92, 360/96

[51] Int. Cl. ............................................ G11b 5/00

[58] Field of Search ............. 274/4 E, 4 F; 242/198; 179/100.2 Z; 352/123

[56] References Cited

UNITED STATES PATENTS 3,603,597 9/1971 Haake ................................ 274/4 F 3,722,892 3/1973 Haake ................................ 274/4 F

FOREIGN PATENTS OR APPLICATIONS 1,197,640 7/1965 Germany ............................ 274/4 E

*Primary Examiner*—Leonard D. Christian

*Attorney, Agent, or Firm*—John E. Peele, Jr.

[57] ABSTRACT

A tape recorder-reproducer having mechanical means for automatically flipping a tape cassette to reproduce each of two separately playable record tracks carried by the tape cassette. The mechanical means includes a mechanism for lifting a tape cassette away from a play station where one of the record tracks was in position for reproduction to a position substantially perpendicular to the play station, for rotating the tape cassette approximately 180° to invert its orientation and for returning the tape cassette to the play station thereby positioning the second record track for reproduction.

15 Claims, 5 Drawing Figures

Inventor:
Robert Haake.
By Kenneth H. Jret Agent
William L. Puml Atty

PATENTED SEP 3 1974

3,833,224

SHEET 2 OF 4

Inventor
Robert Haake
By Agent.
Atty

Inventor:
Robert Haake.
Kenneth H. [illegible] Agent.
By William [illegible] Atty Inventor:
Robert Haake.

By Kenneth H. [illegible] Agent
William [illegible] Atty

TAPE RECORDER WITH CASSETTE INVERTOR

This is a continuation of application Serial No. 50,407, filed June 29, 1970, now abandoned.

The present invention relates to tape recorder-reproducers or the like and, more particularly, to a mechanical control means for automatically flipping a tape cassette to reproduce each of two playable record tracks on a tape carried by the tape cassette.

A previously designed tape recorder-reproducer having a mechanical and electrical control means for automatically reproducing each of two separately playable record tracks of a tape cassette is shown in a copending U.S. application, now U.S. Pat. No. 3,603,597, and assigned to the same assignee of this application.

The previous design included a mechanism for lifting a tape cassette away from the play station to a position with the tape cassette substantially parallel with the play station and thereafter angularly rotating the tape cassette about an axis substantially parallel with the play station for inverting the cassette. This previous method of inverting a cassette requires the product to be designed with a high profile resulting in wasted space within the product and resulting in an undesirable appearance relative to the present demands for low profile products. The present method of inverting a cassette requires less complicated mechanisms which are more economical and which lead to greater performance reliability.

It is the object of the present invention to provide an efficient, low profile and low cost tape recorder-reproducer that is capable of automatically positioning each of two separately playable record tracks for reproduction.

It is another object of this invention to provide a tape recorder-reproducer with a new and improved tape cassette handling mechanism for lifting the tape cassette from a first plane, which is the play station, to a second plane substantially perpendicular to the first plane, which is a position for inverting or angularly rotating the tape cassette approximately 180°, and for returning the tape cassette to the first plane thereby minimizing wasted space within the product and reducing the profile required for the product.

Further and other objects of this invention will be readily understood by those skilled in the art with reference to the following description of the accompanying drawings.

Figure 1:
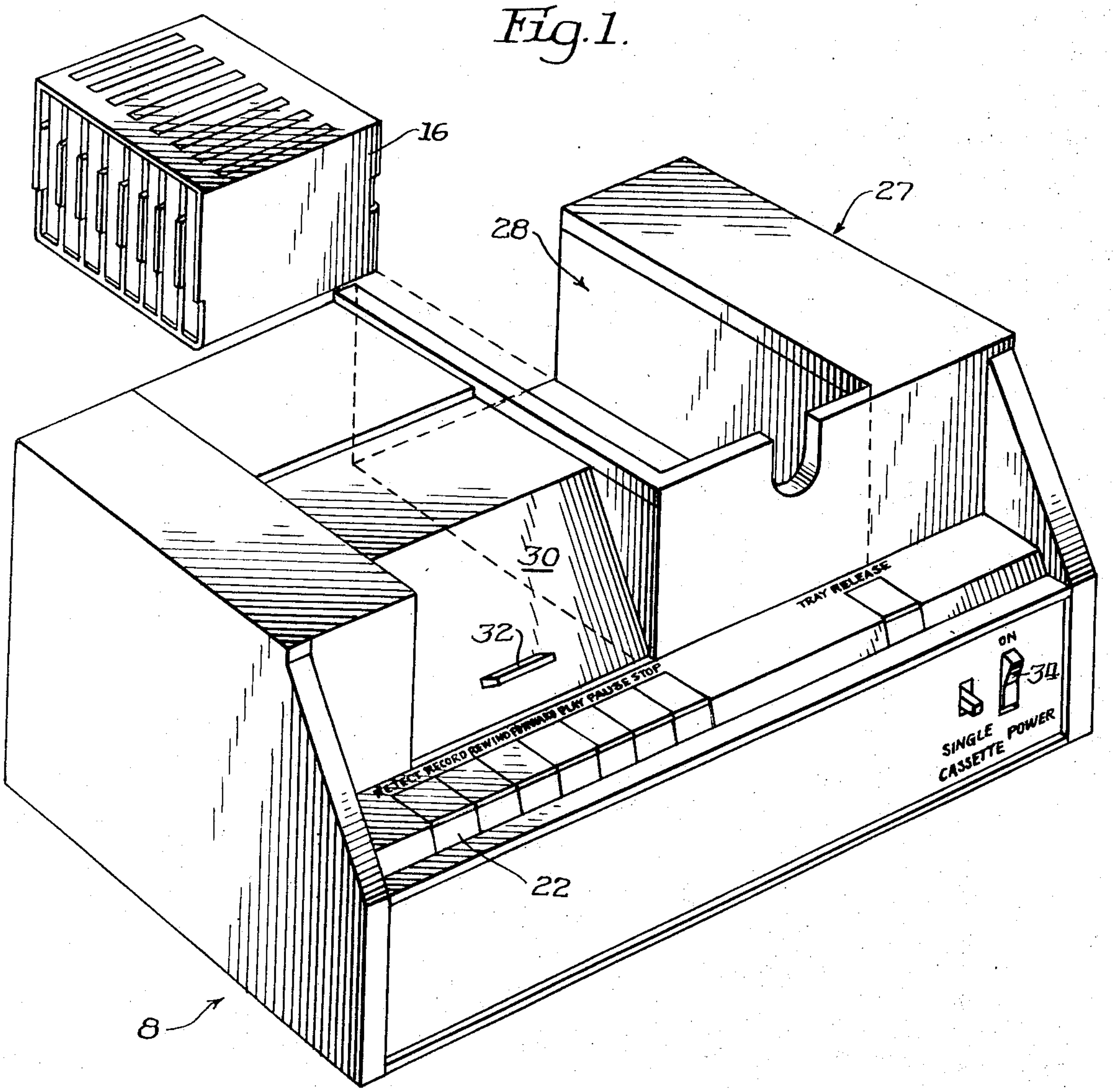
FIG. 1 is a left front perspective view of the tape recorder-reproducer showing the low profile concept.

The basic operation of the present tape recorder-reproducer 8 will be summarized. A tape cassette carrier means 10 has an initial ineffective position in a substantially vertical plane 12. In this position, a tape cassette 14 can be inserted in the carrier means 10 manually or by an automatic inserting and removing mechanism, which is only partially shown in this application, by the use of a tape cassette magazine 16.

A displacement means 18 is coupled to the carrier means 10 and is operable for displacing the carrier means 10 from the initial vertical plane 12 to a substantially horizontal plane 20 for positioning a tape cassette in the play station to reproduce one of the record tracks. The displacement means 18 is further operable to return the carrier means 10 to the vertical plane 12 at the end of one direction of play by an automatic sensing means (not shown) or by depressing a Reject button 22. This cycle is repeated after the tape cassette has been inverted to reproduce the second of the record tracks.

A pivot means 24 is connected to the carrier means 10 and to a power source 26 for effecting a predetermined angular rotation of substantially 180° of the carrier means 10 while the carrier means 10 is in the vertical plane 12. This angular rotation occurs once when the carrier means 10 returns to the vertical plane 12 after reproduction of the first of two playable record tracks thereby orienting the tape cassette to permit reproduction of the second record track. This angular rotation occurs a second time when the carrier means 10 returns to the vertical plane 12 after reproduction of the second record track thereby orienting the tape cassette to be removed from the carrier means 10 in the same orientation as it was inserted.

The structure of the present tape recorder-reproducer will now be described. With reference to FIG. 1, the tape recorder-reproducer 8 has the feature of automatically flipping or inverting a tape cassette for reproducing each of two playable record tracks as well as the feature of a low profile product which is illustrated by the housing 27. The tape cassette magazine 16 is shown to demonstrate that one or more tape cassettes may be supported in the product in an open section 28 without interfering with the desirable low profile. A cover member 30 covers the play station which is located just to the rear of the row of control buttons 22 and covers the area in which the tape cassette is flipped for reproducing each record track. The cover member 30 can be raised by lifting on the cover finger piece 32. An On-Off switch 34 controls the main electrical power for operating the product.

Figure 2:
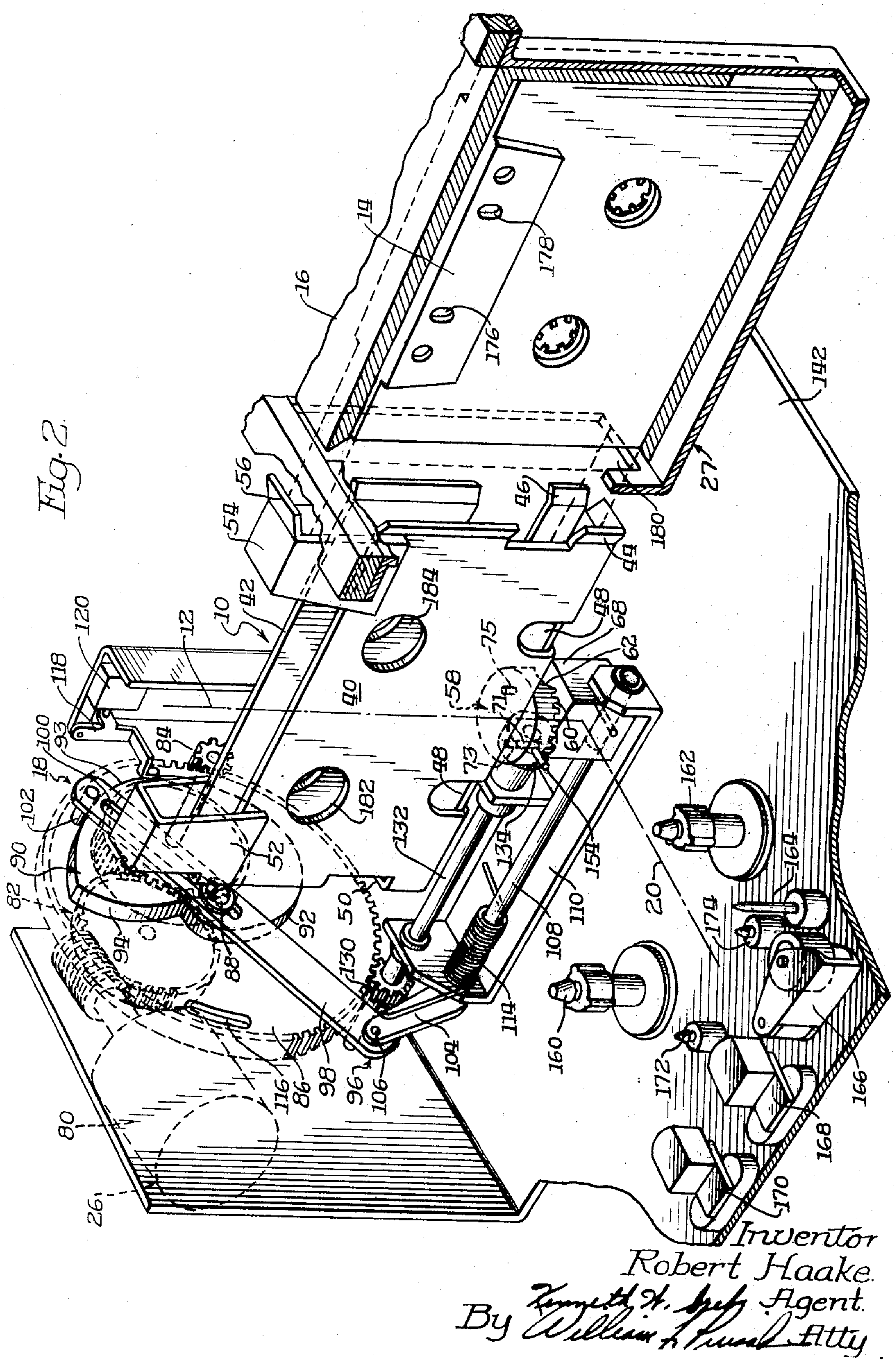
FIG. 2 is a right front perspective view showing the invention in an initial ineffective position.
Figure 3:
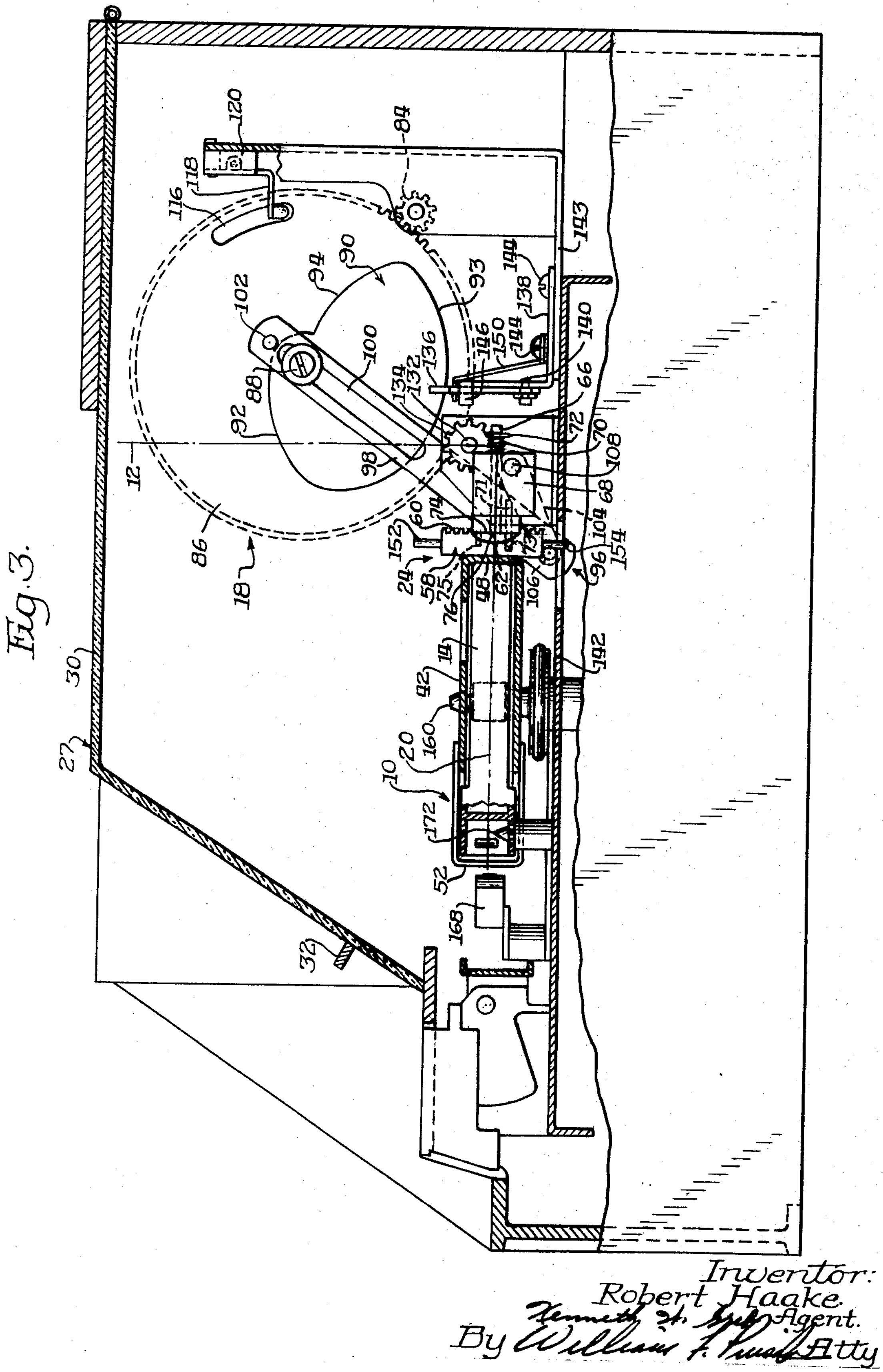
FIG. 3 is a right side elevational view showing the mechanism and the tape cassette in the play station position.

Referring now to FIGS. 2 and 3, the carrier means 10 includes a pair of side walls 40 and 42 having outwardly formed guide portions 44 and 46, for guiding the tape cassette 14 therebetween upon insertion in the carrier means. A bottom support 48 is formed from the side wall 40 for supporting the tape cassette 14. An end wall 50 is formed from the side wall 40 for limiting the extent that the tape cassette can be inserted into the carrier means 10. A left top member 52 and a right top member 54 are each rigidly connected to the side walls 40 and 42 to prevent the tape cassette 14 from coming out the top during the flipping operation. The right top member 54 has an outwardly formed guide 56 to assist in guiding the tape casette into the carrier means 10. p The carrier means 10 further includes a driven member 58 rigidly attached to the bottom support 48 by any conventional method. The driven member 58 is a crown shaped gear having a circular row of teeth 60 with two sections of missing teeth 62 and 64 spaced 180° from each other. The sections of missing teeth 62 and 64 provide a means for uncoupling a rotative power source from the driven member 58 each half revolution thereof. A pivot post 66 is rigidly attached to the driven member 58 in a manner to provide a central rotating axis for the driven member 58 which, in turn, provides a central angular rotational axis for the carrier means 10. The angular rotational axis is shown as the same as plane 12 which is the case when the carrier means 10 is in the vertical plane position. This angular rotational axis is substantially perpendicular to a longitudinal edge of the cassette 14 along which a linear length of tape extends. As viewed in FIG. 3, a post support 68 has a cylindrical opening therethrough for pivotably supporting the pivot post 66. A compression spring 70 is positioned between a spring retainer 72 and the post support 68 for biasing an inside surface 74 of the driven member 58 against a bearing surface 76 of the post support 68. A pin 71 is rigidly supported in post support 68 and extends into an alignment hole 73 in the surface 74 of the driven member 58 for preventing angular rotation of the carrier means 10 during the displacement of the carrier means 10 to and from the play station and during the position shown in FIG. 5. A similar alignment hole 75 is located 180° from the hole 73 for receiving pin 71 thereby holding the carrier means 10 in each of the 180° positions. The spring 70 biases the driven member 58 into engagement with pin 71.

The displacement means 18 includes a power source 26 which comprises a motor 80, a speed reduction gear drive train 82 and a pinion 84. A gear wheel 86 is rotated clockwise about an axis of a shouldered screw 88, as viewed in FIG. 2, by pinion 84 when the motor 80 is energized. A cam 90 integrally extends from the gear wheel 86. The cam 90 has one working surface 92 developed by a gradually increasing radius from the axis of the screw 88 and has a second working surface 94 extending substantially radially toward the axis of the shouldered screw 88.

The displacement means 18 also includes a linkage means 96 for displacing the carrier means 10 from the plan station to the vertical position and back to the play station. The linkage means 96 consists of a link 98 supported on the gear wheel 86 by the screw 88 which extends through a slot 100 extending longitudinally thereof. A cam follower 102 is rigidly assembled at one end of the link 98 and positioned to follow the working surfaces of the cam 90. An arm 104 is pivotably connected at the other end of the link 98 by a shouldered pin 106. The arm 104 is rigidly assembled to a shaft 108 which is pivotably supported by a bracket 110. A pin 112 rigidly connects the post support 68 to the shaft 108.

The control of the linkage means 96 includes the rotation of the gear wheel 86 and the cam 90 carried therewith and the function of a torsion spring 114. The torsion spring 114 is supported on the shaft 108 and has one end engaged with the arm 104 for biasing the cam follower 102 against the cam 90 through the link 98.

When the motor 80 is energized, the gear wheel 86 will be rotated clockwise at a desirable slow rate by the pinion 84. Referring to FIG. 3, the cam 90 rotates clockwise with the gear wheel 86 causing the working surface 92 to gradually drive the cam following 102 and therefore the link 98 upwardly. The link 98, guided by the screw 88 extending through the slot 100, pivots the arm 104 and the shaft 108 clockwise about the axis of the shaft 108. The clockwise motion of shaft 108 pivots post support 68 and the remaining carrier means 10 clockwise about the axis of the shaft 108. The working surface 92 drives the linkage means 96 in this manner to displace the carrier means 10 with a tape cassette 14 carried therein from the play station horizontal plane 20, as shown in FIG. 3, to the vertical plane 12, as shown in FIG. 2.

While the gear wheel 86 continues to rotate, the cam follower 102 follows a dwell surface 93 of the cam 90 to hold the carrier means 10 in the vertical plane 12 for a predetermined time period. During this time period, the pivot means 24 angularly rotates the carrier means 180°. As the gear wheel 86 continues to rotate, the end of the dwell surface 93 is reached and the spring 114 pulls the cam follower 102 along the second working surface 94 of the cam 90. This motion causes the shaft 108 to pivot counter-clockwise until the carrier means 10 is returned to the play station horizontal plane 20. The gear wheel 86 rotates a few more degrees while the carrier means 10 is in the play station until a groove 116 in the gear wheel 86 becomes alinged with a sensing finger 118. Finger 118 is normally biased against the side surface of the gear wheel 86 by a micro switch 120. When the finger 118 moves into the groove 116, the micro switch 120 deenergizes the motor 80 thereby stopping the rotation of the gear wheel 86. The product is now in condition to reproduce from one of the record tracks of a tape cassette.

One revolution of the gear wheel 86 lifts the carrier means 10 from the play station horizontal plane 20 to the vertical plane 12, allows time for a 180° angular rotation of the carrier means 10 and returns the carrier means 10 to the play station.

The pivot means 24 is operable to rotate the carrier means 10 approximately 180° while in the vertical plane 12. A gear 130 is rigidly supported near one end of a shaft 132 which, in turn, is pivotably supported on the bracket 110. A driving member 134 is rigidly supported at the opposite end of the shaft 132. The gear 130 is in mesh with the gear wheel 86 and is rotated counter-clockwise thereby when the motor 80 is energized. The driving member 134 is rotated counter-clockwise (FIG. 2) by the gear 130 but is normally ineffective due to the driving member teeth being in alignment with one of the sections of missing teeth 64 of the driven member 58.

Figures 4, 5:
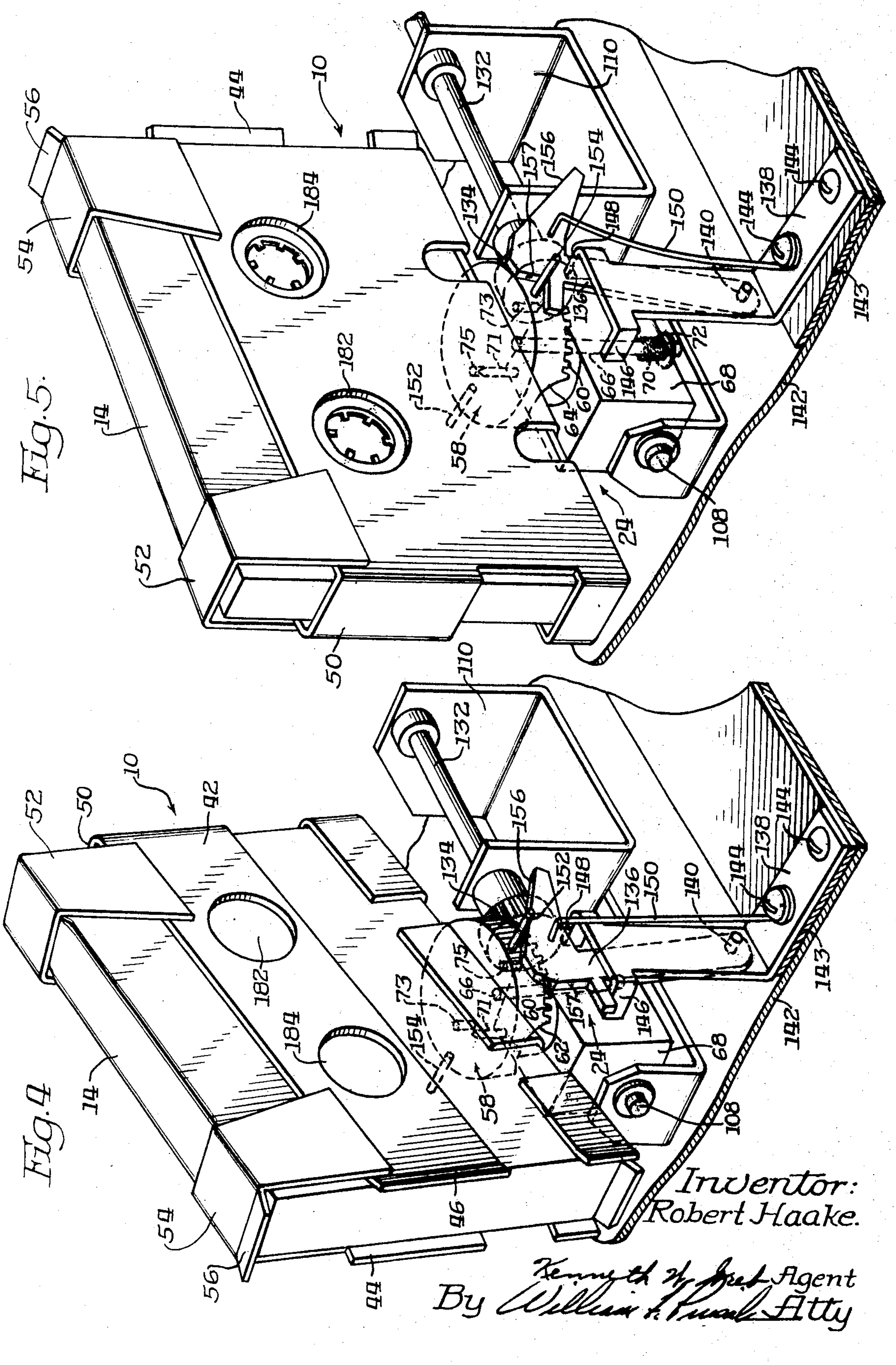
FIG. 4 is a left rear perspective view showing the mechanism starting the angular rotation of the tape cassette.
FIG. 5 is a view similar to FIG. 4 showing the mechanism at the end of a 180° angular rotation of the tape cassette.

Referring now to FIGS. 4 and 5, the coupling of the driving member 134 to the driven member 58 will now be described. A cam member 136 is pivotably supported in a bracket 138 by a pin 140. The bracket 138 is rigidly assembled to a frame member 143 by screws 144. The cam member 136 is rockable between limiting ears 146 and 148 formed from bracket 138. A spring 150 is anchored to one of the screws 144 and is connected to the cam member 136 for biasing the cam member 136 against the ear 146. A cam follower 152 rigidly extends from the driven member 58. An abutment 154 rigidly extends from the driven member 58 at a position substantially 180° from the cam follower 152.

As the carrier means 10 approaches the vertical plane 12, when displaced from the play station by the displacement means 18, the cam follower 152 engages the follows a cam surface 156 of the cam member 136 which first lifts the carrier means 10 to disengage from pin 71 and thereafter angularly rotates the driven member 58 about the axis of the pivot post 66. The driving member 134 is being rotated by the gear wheel 86 in a clockwise direction as viewed in FIGS. 4 and 5. The angular rotation of the driven member 58 moves the teeth 60 into engagement with the driving member 134 when the carrier means 10 has reached the vertical plane 12. The driving member 134 now rotates the driven member 58 until the section of missing teeth 62 becomes aligned with the driving member 134 resulting in a substantially 180° angular rotation of the carrier means 10. Spring 70 now biases driven member 58 into engagement with the pin 71 to prevent further angular rotation of the carrier means 10. During the last portion of angular rotation, the abutment 154 of the driven member 58 engages a side edge 157 of the cam member 136 and pivots the cam member 136 into contact with the ear 148, as shown in FIG. 5. This prevents further angular rotation of the carrier means 10 beyond the 180° movement which could occur from the momentum of the rotating carrier means 10. The tape cassette 14 has now been inverted for reproducing a second one of the record tracks when the carrier means 10 returns the tape cassette to the play station.

When the carrier means 10 is displaced from the vertical plane 12 to the horizontal plane 20 and returned to the vertical plane 12, the spring 150 has moved the cam member 136 against the ear 146 and the abutment 154 now acts as the cam follower 152 by contacting and following the cam surface 156 for engaging the driven member 58 to the driving member 134. The cam follower 152 now acts as the abutment 154 by contacting and moving the cam member 136 against the ear 148 for stopping angular rotation of the carrier means 10 after 180° rotation.

Referring back to FIG. 2, the play station is shown to include drive spindles 160 and 162 for driving and rewinding a tape. A drive capstan 164 with a pressure roller 166, a reproduction head 168 and a record head 170 are shown as symbolic of conventional tape recorder-reproducer features. A pair of posts 172 and 174 enter apertures 176 and 178 in the tape cassette 14 for aligning the tape cassette 14 in the play position and for holding the carrier means 10 in the play station horizontal plane 20. A portion of the magazine 16 is shown for positioning the tape cassette 14 in alignment with an opening 180 in the housing 27, which, in turn, is in alignment with the carrier means 10 when the carrier means 10 is in the vertical plane 12. Side walls 40 and 42 of the carrier means 10 have aligned openings 182 and 184 therein to permit driving spindles 160 and 162 to extend therethrough.

What is claimed is:

1. A tape cassette handling mechanism for a tape recorder-reproducer having a load station and a record-play station for recording on and reproducing from a plurality of separate record-play tracks on a tape cassette, one of the record-play tracks being recorded in a first direction of tape movement, another of the record-play tracks being recorded in an opposite direction, the cassette having a longitudinal edge along which a linear length of tape extends and along which tape is accessible for recording and reproducing, the mechanism comprising:

carrier means having a cassette receiving opening therein permitting insertion and removal of a cassette when said carrier means is in a plane including said load station, said carrier means being supported for pivotal movement about an axis parallel with the longitudinal edge of a cassette inserted in said carrier and for movement about an axis perpendicular to and through the longitudinal edge;

displacement means operatively coupled to said carrier means for moving said carrier means back and forth about said longitudinally extending axis between said plane including said load station and a second plane perpendicular to said load station plane, said second plane being at the record-play station to permit record-reproduction of one of the record-play tracks of a cassette; and pivot means supporting said carrier means on said displacement means for angular rotation of said carrier means to invert the cassette about said axis perpendicular to said longitudinal edge of the cassette and perpendicular to said first axis when said carrier means is in said first plane;

said displacement means further being operable following rotation of said carrier means in said first plane to return the carrier and the inverted cassette to said second plane and the record-play station to permit record-reproduction of said another of the record-play tracks.

2. A tape recorder-reproducer as in claim 1, further comprising a housing having an opening therein, and wherein said carrier means has an opening therein in alignment with said housing opening when said carrier means is in said second plane for receiving and removing a tape cassette.

3. A tape recorder-reproducer as in claim 2, wherein said pivot means includes a driving source and a coupling means for coupling said driving source to said carrier means for effecting said inversion.

4. A tape recorder-reproducer as in claim 3, wherein said coupling means includes a driving member rotatable by said driving source, a driven member rigidly connected to said carrier means and operable for coupling with said driving member for angularly rotating said carrier means, said driven member including means uncoupleable from said driving member when said carrier means is in said second plane.

5. A tape recorder-reproducer as in claim 4, wherein said driving member is a gear having teeth thereon and said driven member is a gear having teeth thereon which is engageable with said driving member, and said uncoupleable means of driven member is a section of missing gear teeth.

6. A tape recorder-reproducer as in claim 5, wherein said driven member has two sections of missing teeth, each located substantially 180° from the other whereby said driving member drives said driven member substantially 180° for inverting the orientation of said one cassette to permit reproduction of each record track.

7. A tape recorder-reproducer as in claim 3, wherein said coupling means includes a driving member rotatable by said power source, a driven member rigidly connected to said carrier means, a cam member located adjacent said pivot means, and a cam follower supported by said carrier means and operable by said cam member to couple said driven member to said driving member for effecting angular rotation of said carrier means.

8. A tape recorder-reproducer as in claim 7, wherein said cam follower is carried by said driven member for engagement with said cam member for partial angular rotation of said driven member to couple said driven member to said driving member in response to movement of said carrier means by displacement means, said driven member thereafter completing said predetermined angular rotation by said driving member.

9. A tape recorder-reproducer as in claim 7, wherein said driven member includes an abutment and said cam member includes an abutment surface engaged by said driven member abutment for stopping the angular rotation of said driven member for positioning said one cassette in an inverted orientation to permit reproduction of another record track.

10. A tape recorder-reproducer as in claim 7, further comprising an abutment surface located in the path of said cam follower, said cam follower being operable on said cam member to couple said driven member to said driving member as a first funciton and being operable on said abutment surface for stopping angular rotation of said carrier means as a second function.

11. A tape recorder-reproducer as in claim 1, wherein said displacement means includes means supporting said carrier means, linkage means connected to said supporting means, and control means connected to said linkage means and operable for effecting displacement of said carrier means from said first plane to said second plane and return to said first plane.

12. A tape recorder-reproducer as in claim 11, wherein said control means includes a spring for biasing said carrier means from said second plane to said first plane.

13. A tape recorder-reproducer as in claim 11, wherein said control means includes an actuating member operably connected to said linkage means for displacing said carrier means from said first plane to said second plane.

14. A tape recorder-reproducer as in claim 13, wherein said actuating member is a cam and said linkage means includes a cam follower driven by said cam for displacing said carrier means from said first plane to said second plane.

15. A tape recorder-reproducer as in claim 14, wherein said control means includes a spring for urging said cam follower against said cam for urging said carrier means from said second plane to said first plane when said cam moves out of the path of said cam follower.

* * * * *